Figure 1:
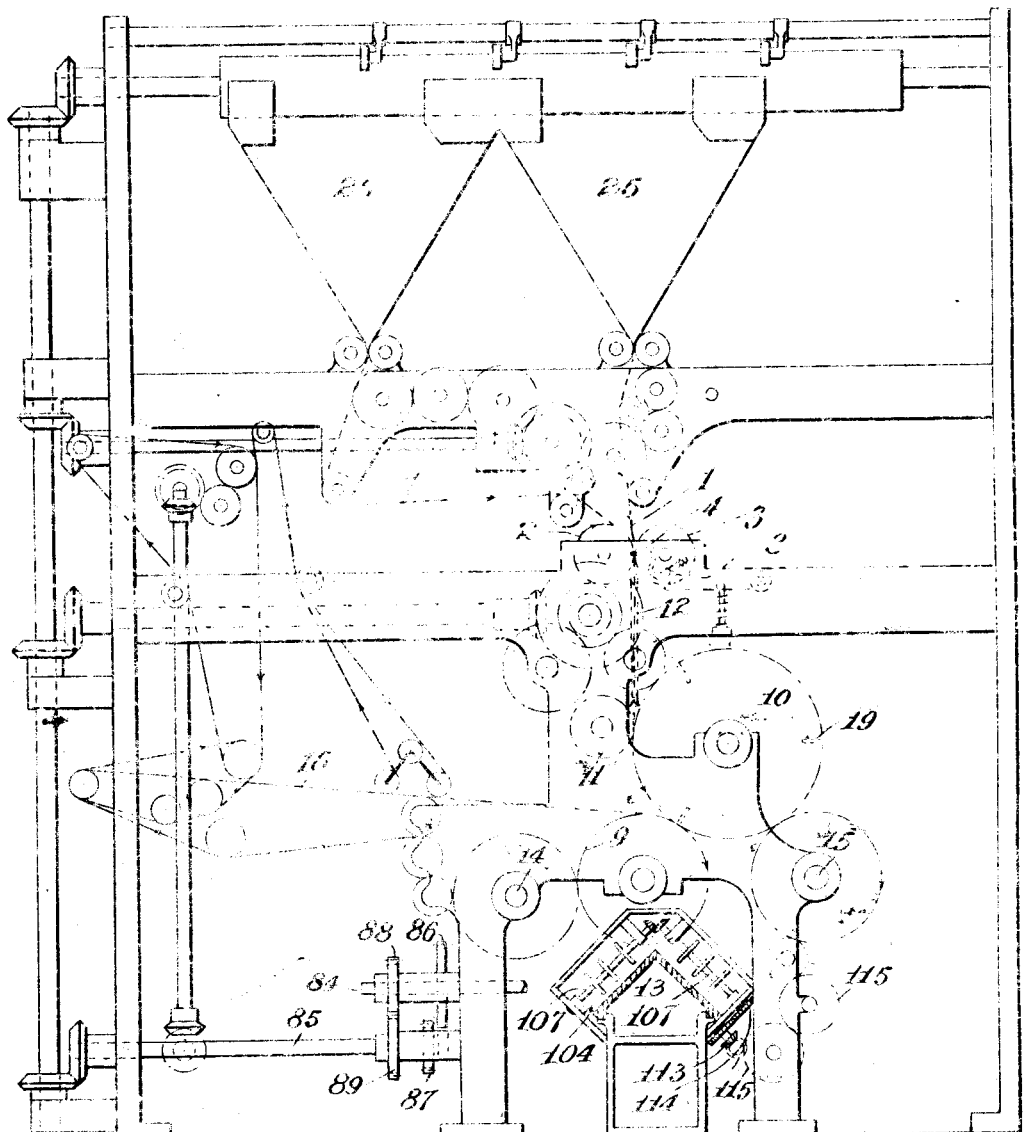

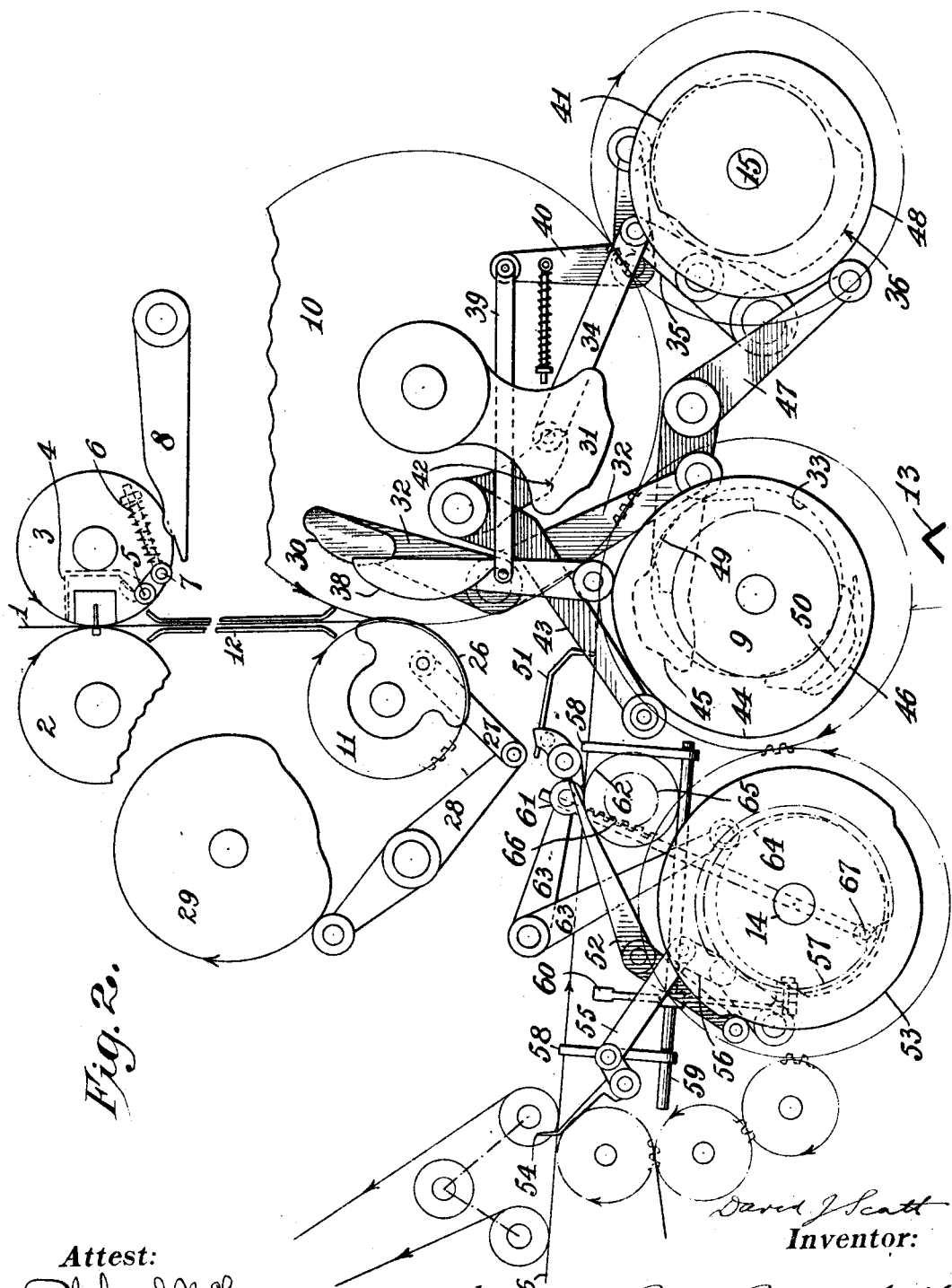

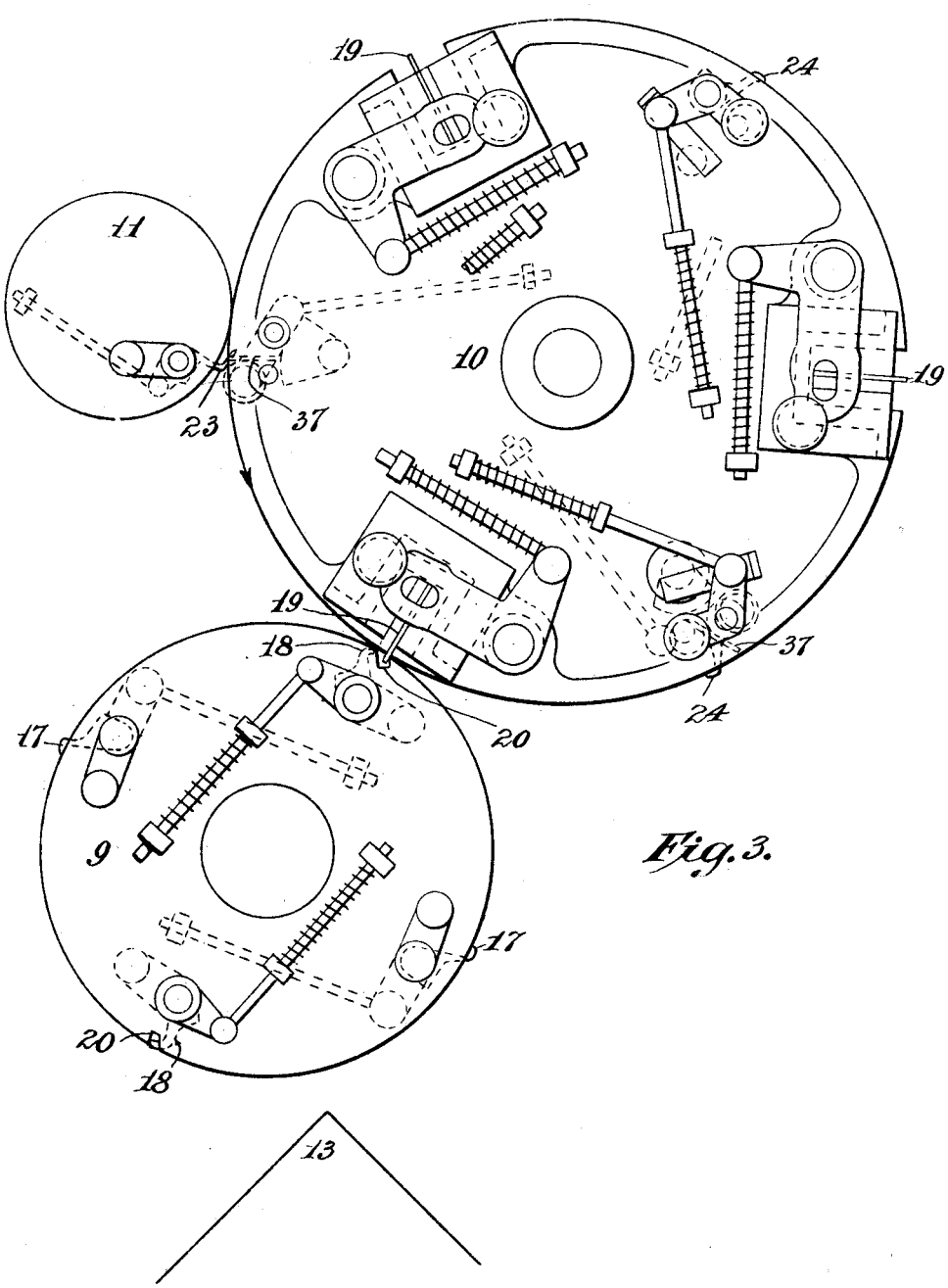

D. J. SCOTT.
FOLDING AND STITCHING MACHINE.
APPLICATION FILED SEPT. 23, 1911.
1,064,387.
Patented June 10, 1913.
6 SHEETS—SHEET 4.
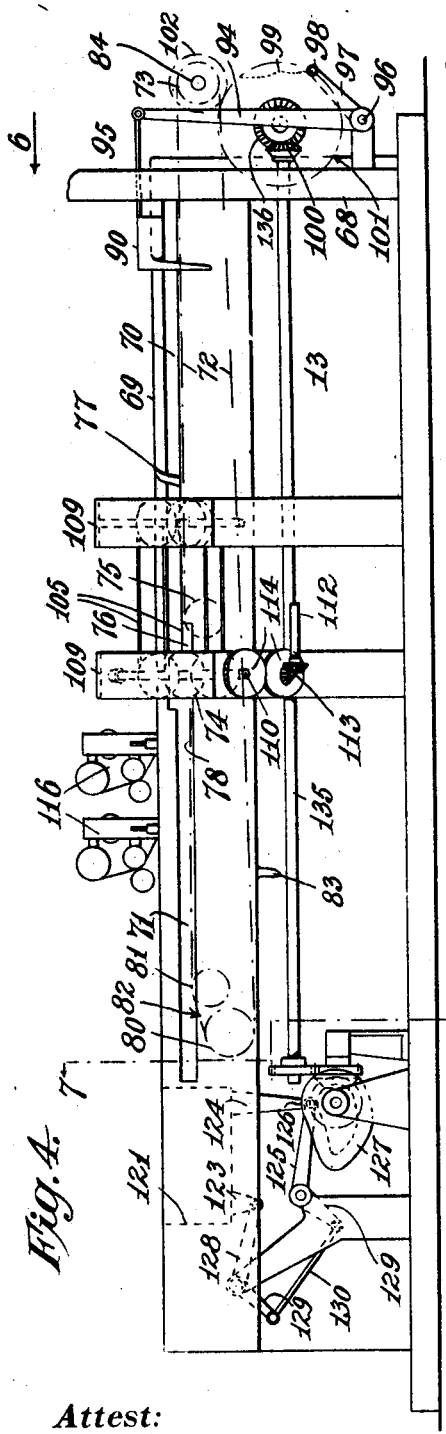
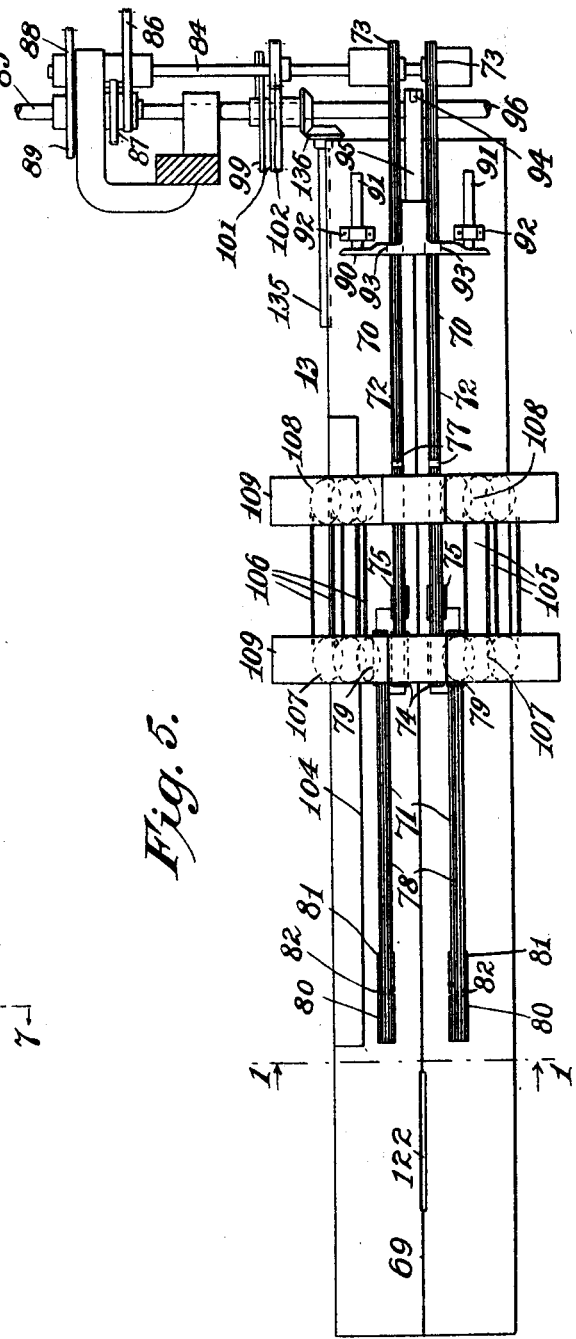
Attest:
Inventor:
David J Scott
by Brock Beeken Smith
Att'ys.

D. J. SCOTT.
FOLDING AND STITCHING MACHINE.
APPLICATION FILED SEPT. 23, 1911.

1,064,387.

Patented June 10, 1913.
6 SHEETS—SHEET 5.

D. J. SCOTT.
FOLDING AND STITCHING MACHINE.
APPLICATION FILED SEPT. 23, 1911.

1,064,387.

Patented June 10, 1913.
6 SHEETS—SHEET 6.

Attest:
Philip S. McLean
J. Houghton

Inventor:
David J. Scott
by Brock Becken
Attys.

UNITED STATES PATENT OFFICE.

DAVID J. SCOTT, OF PLAINFIELD, NEW JERSEY.

FOLDING AND STITCHING MACHINE.

1,064,387. Specification of Letters Patent. Patented June 10, 1913.

Original application filed July 22, 1910, Serial No. 573,168. Divided and this application filed September 23, 1911. Serial No. 650,967.

*To all whom it may concern:*

Be it known that I, DAVID J. SCOTT, a citizen of the United States, and a resident of Plainfield, in the county of Union and State of New Jersey, have invented certain new and useful Improvements in Folding and Stitching Machines, of which the following is a specification.

The present invention relates to folding and stitching machines, and has more particularly reference to a folding and stitching device adapted for use in connection with web printing machines.

The present application is a division of application Serial No. 573,168, filed July 22, 1910.

Heretofore it has been customary in the prior art, when it has been desired to stitch a pack of sheets without the intervention of the operator, to mount the stitcher heads on cylinders forming a part of or located adjacent to the folding devices of the machine. Generally it has been the custom to stitch the sheets first and fold them afterward. It is sometimes advantageous to stitch the pack of sheets after they are folded and one of the objects of the invention is to provide means whereby the sheets may, if desired, be folded before stitching.

Another object of the invention is to provide in connection with a web printing or other machine a rectilinear conveyer for the sheets, and in connection with this conveyer to provide a stitching mechanism. This obviates the necessity of using a special and complicated construction of stitchers as is necessary when rotary members or cylinders carry the stitcher mechanism and simplifies the problem of folding and stitching in one machine to a considerable extent.

Accordingly, one feature of the invention resides in locating a rectilinear sheet path adjacent to the cutting or other cylinders, which are arranged at one end of the web of the printing or other machine and adjacent to the associating means for the webs, which sheet path is adapted to receive the sheets from the cutting or other cylinders and to convey the said sheets to a stitcher.

According to this invention, the sheets may be folded before or after stitching, as may be desired, but in the preferred form herein disclosed the sheets are folded before stitching.

According to the present embodiment of this invention, the columns on the form cylinders of the web printing machine are preferably arranged lengthwise of the cylinders and transversely of the movement of the web, while the sheet path preferably extends substantially parallel with the movement of the web and receives the sheets from the cutting or other cylinders at the end of the press, in such a manner that the printed columns on the sheets are parallel to the direction of movement of the web. This rectilinear sheet path may extend either in under the machine, or, as shown in the present embodiment of the invention, outwardly away from the machine. The sheet path may be of any suitable construction adapted for the purpose of conveying the sheets from the cutting or other cylinders to the stitcher. In the present form there is utilized a saddle to carry the sheets to the stitcher. It will be understood that to carry a sheet or a pack of sheets successfully on a saddle, it is necessary first to fold the sheet or sheets in order that the paper may have a definite crease which will rest on top of the saddle. In connection with the use of a saddle, or independently thereof, the invention further consists in a peculiar means for folding the sheets without closing them up, consisting in the present instance of a rotary member and grippers into which the leading edge of the sheet is received. Nippers are provided on this same rotary member, and a creaser is provided which folds the sheet into the bite of the nippers, while the leading edge of the sheet is held by the grippers, the grippers continuing their onward movement with the sheet after it has been folded, in the same direction as before folding. The word "grippers", as used herein, is intended to cover any sheet retaining or holding devices which may be used for the purpose of carrying out this invention. Likewise, the stitching may be done either by means of wire staples, or by means of a sewing machine, and the term "stitcher" or "stitching" as herein used should be considered to include both meanings. When the foregoing means of folding the sheets without closing them up are utilized in connection with the saddle or other sheet support, it is necessary to provide means which will close up the sheets after they have been stitched. While the sheet path or support, or specifically the saddle, may be of any suitable construction, it is preferred to utilize in connection therewith an endless conveyer extending longitudinally of the sheet support and provided with a pusher finger projecting above the plane of the sheet support, said conveyer having a deflected portion near one end thereof, whereby the pusher finger as it reaches said deflected portion is caused to gradually recede below the plane of the support. This deflected portion extends in a downward direction and is utilized for the purpose of causing the pusher finger to be brought out of engagement with the pack of sheets and to cause the said pack of sheets to dwell under the stitchers. The saddle, as is well known, is an inverted V-shaped sheet support on the peak of which the crease in the sheets travels. When this peculiar conveyer with the deflected portion is utilized in connection with the saddle, it is preferable to provide a second conveyer which is offset laterally with reference to the first conveyer, whereby said second conveyer will carry the sheets away from the stitcher after they have been stitched.

Another feature of the invention resides in means for folding a pack of sheets, and in stitching the said sheets approximately in the fold of the sheets. This is effected by the means already described, and in this manner the crease in the paper determines the position of the stitch.

The invention further consists in the features of construction, combination of parts and arrangement of elements hereinafter set forth.

In the accompanying drawings the invention is disclosed in several concrete and preferred forms, but changes of construction may of course be made without departing from the legitimate and intended scope of the invention.

Figure 6:
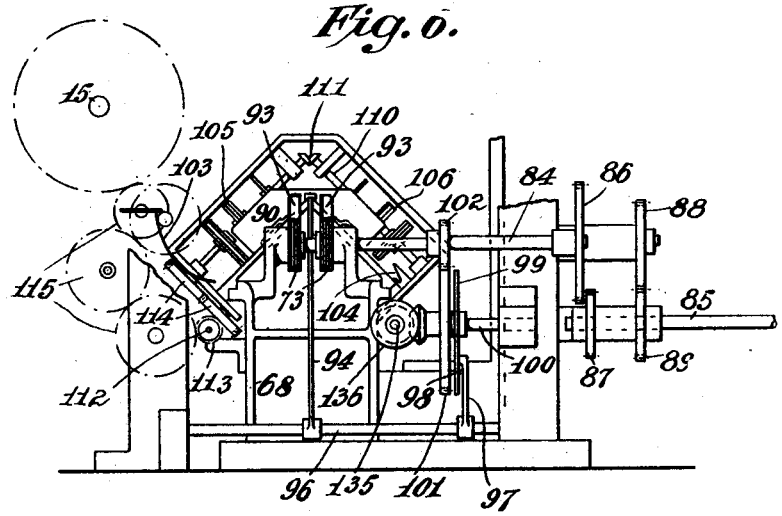
Figure 7:
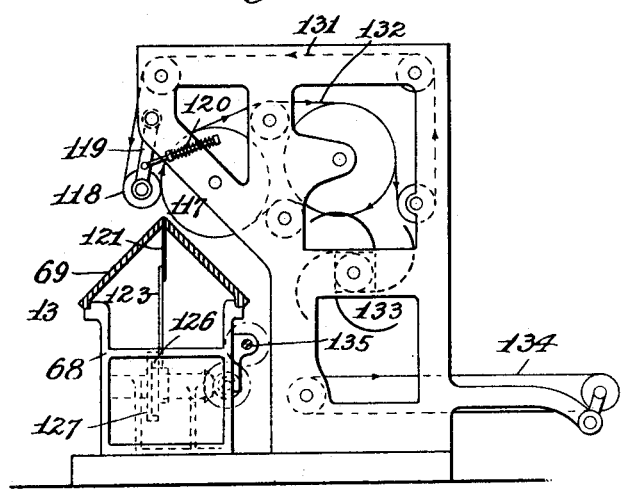
Figure 8:
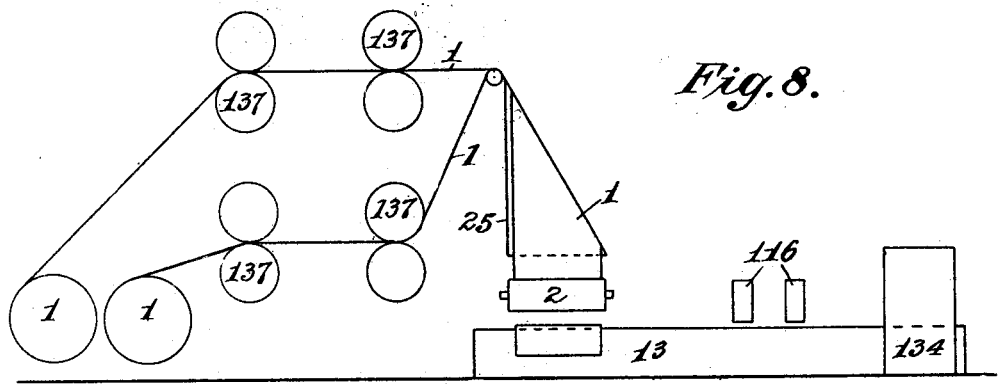
Figure 9:
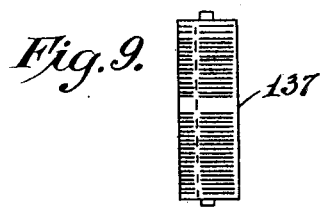
Figure 10:
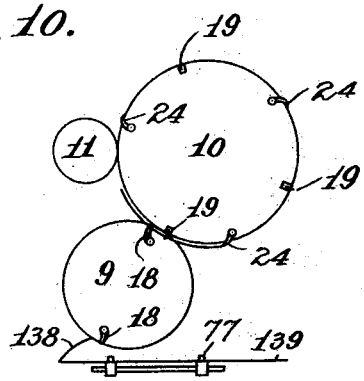
Figure 11:
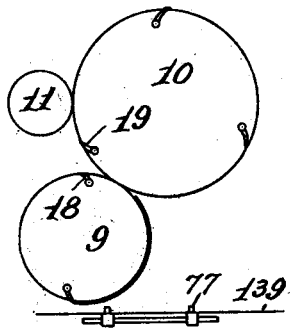

In the said drawings: Figure 1 is an end view of a web press showing the former folders, cutting and other cylinders, with the saddle in section on the line 1—1 of Fig. 5, embodying the invention. Fig. 2 is a view similar to Fig. 1 of the cutting and folding cylinders and adjacent parts, showing more particularly the cams for operating the various grippers, nippers, creasers, &c. Fig. 3 is a view similar to Fig. 2, showing the arrangement of the grippers, nippers and creasers of the feeding cylinders. Fig. 4 is a side elevation of the saddle, and the sheet conveying means associated therewith. Fig. 5 is a top plan view of Fig. 4. Fig. 6 is an end view of the saddle and adjacent parts looking in the direction of the arrow 6, Fig. 4. Fig. 7 is a sectional view of the saddle on the line 7—7, Fig. 4, showing the delivery mechanism. Fig. 8 is a diagrammatic view showing the invention applied to a web printing machine. Fig. 9 is a plan view of one of the plate cylinders showing the columns running lengthwise of the longitudinal axis of the cylinder. Figs. 10 and 11 are diagrammatic views showing modifications of the invention.

Similar characters of reference indicate corresponding parts in the several views.

The folding and stitching devices are ders between which the webs are led and and the webs 1 are supposed to come from the usual former folders or associators 25 of the press.

2 and 3 indicate a pair of cutting cylinders between which the web sare led and which serve to sever the paper into sheets in the usual manner.

4 indicates a stripping finger pivoted at 5 and normally held beneath the surface of the cylinder by means of the spring 6.

7 indicates the cam roll mounted on an arm of the stripper finger 4, and adapted to engage with the cam 8 on the framework. This cam serves to throw the stripper fingers outward, thereby preventing the sheet from adhering to the knife of the cutting cylinder.

9 indicates a cylinder or rotary member whose circumference is equal to about two sheet lengths. Above the cylinder 9 is a second cylinder or rotary member 10 whose circumference is equal to about three sheet lengths, and adjacent thereto is a collecting cylinder 11 whose circumference is about one sheet length. Extending between the cutting cylinders 2 and 3 and the cylinders 10 and 11 are a pair of guides 12 by means of which the sheets are transmitted from the cutting cylinders to the cylinders 10 and 11. Beneath the cylinder 9 is the saddle 13. 14 and 15 indicate two cam shafts. Extending up to the point of contact between the cylinders 9 and 10, is a sheet path 16, which may lead from another part of the printing machine, and which may be utilized to feed a cover, which cover is then associated with the sheet or sheets received from the cutting cylinders 2 and 3.

The cylinder 9 is provided with two sets of grippers 17, and with two sets of nippers 18. These nippers are located in the rear of the grippers with respect to the direction of the rotation of the cylinder. The cylinder 10 is provided with three sets of creasers 19, which are adapted to coöperate with the nippers on the cylinder 9. The leading edge of the sheet is seized by the grippers 17, and the sheet is carried along until the nippers 18 and the creasers 19 come opposite each other, when the said creasers act to fold the sheet into the grooves 20 of the cylinder 9, after which, the fold in the paper is nipped positively by the nippers 18. The sheet, however, continues moving in the same direction as before, since the grippers 17 are still retaining their hold upon the leading edge thereof. When the grippers 17 arrive at a point indicated by 21, on the cylinder 9, the grippers 17 are opened and the leading edge of the sheet is permitted to drop. The fold in the paper is however still held by the nippers 18. This causes the leading edge of the sheet to drop down on one side of the saddle 13, and when the nippers arrive at about the point marked 22, on cylinder 9, they are opened and the tail of the sheet falls on the other side of the saddle 13. The sheet is thus made to straddle the saddle. In case it is desired to collect two successive cuts of sheets, the first pack of sheets is taken by the grippers 23 on the collecting cylinder 11. This cylinder has a circumference approximately equal to the length of one sheet, so that when the next succeeding pack of sheets descends through the guides 12, the grippers 24 on the cylinder 10 will receive sheets not only from the said guides but also from the collecting cylinder. As will be observed, in the present instance, the cylinder 10 is used only for the purpose of carrying the creaser blades, but also for the purpose of conveying the sheets to the cylinder 9. It will be understood, however, that it is not necessary that this cylinder 10 should be utilized for this purpose, since the sheet may be led to the cylinder 9 in any suitable manner, as, for instance, from the sheet path 16. However, the arrangement shown is a preferred form and is convenient when it is desired to collect successive packs of sheets.

The sheet retaining and folding devices of the cylinders 9, 10 and 11, together with the means for operating the same may be of any suitable construction. In the present instance they are constructed as follows: The grippers 23 which are carried on the cylinder 11 are of the usual construction and are opened by means of the oscillating gripper cam 26 actuated by means of the link 27, rocking lever 28, and rotating cam 29. The cylinder 11 is utilized only when it is desired to collect successive packs of sheets, and when no collecting is to be done the grippers 23 are rendered inoperative. The grippers 24 of the cylinder 10 are of the usual construction and are opened to receive the sheets by means of the cam 30, and are opened to discharge sheets by means of the cam 31. When no collecting takes place these cams are stationary but when successive packs of sheets are collected, these cams oscillate so as to act on every other set of grippers 24 only. For this purpose the cam 30 is mounted on the pivoted rocking lever 32 which is rocked by means of the rotating cam 33. Likewise the cam 31 is mounted to oscillate and is actuated by means of the link 34, rock lever 35 and rotating cam 36.

Adjacent to each set of grippers 24 are the joggers or gages 37. For the sake of clearness the grippers 24 and gages 37 are shown conjointly at only one point of the cylinder 10, at the other two points where these members are located there is shown in one instance the grippers only and in the other instance the gages only. The function of these gages is to bring the pack of sheets, received simultaneously by the gripper 24 from the guides 12 and the collecting cylinder 11, into register. These gages are normally within the circumference of the cylinder 10, but are caused to protrude alternately at the axial line between the cylinders 10 and 11 by means of the oscillating cam 38. This oscillating cam is operated by means of the link 39, bell crank 40 and rotating cam 41. When collecting does not take place these gages may be dispensed with.

The creasers 19 are actuated by means of the cam 42. When no collecting takes place this cam is stationary, but when successive packs of sheets are taken the cam 42 is caused to oscillate so as to come into operation on alternate creaser blades only. To this end the cam 42 is connected to the arm 43 which is actuated by means of the rotating cam 44.

The grippers 17 of the cylinder 9 are opened by the cam 45 to receive sheets and by the cam 46 to discharge sheets. When no collecting takes place the cam 45 is stationary, but when it is desired to collect successive packs of sheets the cam is oscillated by means of the lever 47 and rotating cam 48. The nippers 18 of the cylinder 9 are opened by means of the cams 49 and 50.

Interposed in the sheet path 16 near the cylinder 9 are suitable front gages 51 against which sheets fed down the sheet path 16 may be registered. These front gages are periodically raised at intervals by means of the cam lever 52 and rotating cam 53.

54 is a tail jogger for causing the sheet to register against the front gages 51. This tail jogger is operated by means of the link 55, cam lever 56 and rotating cam 57.

58 are side joggers mounted on the rockshaft 59 to which motion is imparted by means of the lever 60 and a suitable cam (not shown). After the sheet has been properly registered, the drop roller 61 descends into contact with the friction roll 62, the roll 61 being operated by means of the bell crank 63 and rotating cam 64. The friction roll 62 is operated by means of the pinion 65, rack 66 and crank 67 to feed the sheet or sheets into the bite of the grippers 17 of the cylinder 9.

The saddle 13 consists of a supporting framework 68 provided with an inverted V-shaped top 69. This saddle extends longitudinally with the axes of the cylinders 9, 10 and 11 and is provided in its inverted V-shaped top 69 with two sets of longitudinally extending slots 70 and 71, one slot of each set being located on each side of the saddle, and the slots 71 being laterally offset on each side of the saddle, and the slots 71 being laterally offset from the slots 70. Extending through the slots 70 are chains 72 preferably of the "silent" type, such as are used in automobile works. These chains are driven by sprockets 73 and 74. The forward sprockets 74 are in a plane lower than the sprockets 73, and an idler 75 is interposed to maintain the chain horizontal until a certain point is reached, when the chains have a deflected portion 76 owing to the fact that the sprockets 74 are in a lower plane. The chains 72 are endless and their length is preferably about six times the width of the sheets. The chains are divided into three sections, and each section is provided with a pusher finger 77. The function of these pusher fingers is to convey the sheets along the saddle until they reach the deflected portion 76 when the pusher fingers disappear beneath the sheets, leaving the latter at rest.

78 indicates two similar chains arranged in the slots 71. These chains are lower than the chains 72 and are of the same construction as the latter, passing over the sprockets 79 and 80, the latter sprockets being located in a plane lower than the sprockets 79. An idler 81 is interposed as before and the chains have a deflected portion 82 similar to the portion 76 of the chains 72. The sprockets 74 and 79 are located in the same plane and are mounted on the same shaft. The chains 78 have pusher fingers 83 arranged in the same manner as the pusher fingers 77. The slots 70 and 71 communicate with each other as shown.

The sprockets 73 are mounted on the shaft 84 which is driven from the shaft 85 by means of change speed gears 86, 87, 88 and 89. The gears 86 and 87 are half speed gears, while the gears 88 and 89 are full speed gears; that is to say, at full speed the chains are so timed as to convey sheets delivered from the cylinder 9 when that cylinder delivers two packs of sheets to every revolution, while at the half speed the chains are so timed as to convey sheets delivered from the cylinder 9 when that cylinder delivers one pack of sheets to every revolution. In other words, when collecting takes place the chains are run at half speed.

90 is a pusher consisting of a blade which fits over the top of the saddle 13 and extends downwardly fitting the sloping sides of the saddle snugly. This pusher is given a reciprocating movement longitudinally of the saddle and is provided with slides 91 traveling in the guides 92 of the saddle. The blade of the pusher is provided with slots 93 through which the chains 72 pass, these slots being of a sufficient height to permit the pusher fingers 77 to pass through the same. The blade is connected to a rocker arm 94 by means of the lever 95. The rocker arm 94 is mounted on the shaft 96 which is rocked by means of the cam lever 97, cam roll 98 and rotating cam 99. The cam 99 is mounted on the shaft 100 which receives its motion from the shaft 84 through the spur gears 101 and 102. The configuration of the cam 99 is such that the pusher 90 is given a slow forward starting motion and then a quick forward motion, so that the sheets will be moving rapidly when the pusher fingers 77 engage them. To assist the sheets to drop properly on the saddle, there may be employed a rotating beater 103. In place of this there may be used a stationary guard similar to the guard 104 on the other side of the saddle. The guard 104 is used to keep the lower edges of the sheets from flapping up on one side. To further aid in keeping the sheets properly on the saddle, there may be employed tapes 105 and 106. These tapes are arranged on a slant on both sides of the saddle and pass over the pulleys 107 and 108, which are suitably arranged in housings 109 extending over the saddle. The pulleys 107 are mounted on two transversely extending shafts 110, extending diagonally and substantially parallel to the sloping sides of the saddle. These two shafts are geared together by means of miter pinions 111, and one of them receives its motion from the horizontal shaft 112 through the bevel gears 113 and spur gears 114. The shaft 112 receives its motion from the cam shaft 15 through the gears 115.

Located adjacent to the saddle, about midway of its length, is a suitable stitcher 116, shown in this instance as a stapling device. Located at the end of the saddle is a delivery mechanism and a means for closing up the sheets. In this instance there is provided a drum 117 adjacent to which is a swinging pressure roller 118 mounted on an arm 119 and normally kept in contact with the drum by means of a spring 120. Located underneath the saddle is a tucker blade 121 which passes up through an aperture 122 in the peak of the saddle. This tucker blade 121 is carried by two arms 123 and 124, the latter of which is connected directly to the arm 125 carrying the cam roll 126 and operated by the cam 127. The arm 123 is connected to the arm 125 by means of the lever 128, arms 129 and link 130. By this means the tucker blade is raised at intervals to bring the sheets into the bite of the rollers 117 and 118. Passing over the rollers 117 and 118 are tapes 131 and 132 which, passing over suitable idlers and rollers, convey the sheets to the S-delivery 133, and thence to the delivery belt 134. The stitcher 116, tucker blade 121 and delivery tapes, &c., are driven from the shaft 135 by suitable gearing. The shaft 135 receives its motion from the shaft 100 by means of the bevel gears 136.

The operation of the machine is as follows: The webs 1 passing through the press are printed by the cylinders 137, the columns of which are arranged lengthwise of the longitudinal axes of the said cylinders. Thereafter the webs are led up to the web associating means such as the former folders 25, and down between the cutting cylinders 2 and 3, where the web is severed into sheet lengths. From thence the sheets pass down through the guides 12 to the cylinder 10 where they are taken by the grippers 24. If it is desired to collect, alternate packs of sheets are taken by the grippers 23 on the cylinder 11 and by them delivered with the next pack of sheets to the grippers 24 of the cylinder 10. The grippers 24 of the cylinder 10 deliver the sheets to the grippers 17 of the cylinder 9 and as the sheets travel along on said cylinder the creaser blades 19 fold the sheets into slots 20 where the fold is seized by the nippers 18. The grippers 17, however, continue to retain their hold on the leading edge of the sheets until the peak of the saddle 13 is passed, when the grippers 17 release their hold, and one side of the sheets drops down on one side of the saddle. The nippers 18 continue their hold upon the fold of the paper until the saddle is reached when they release the sheets, which then drop down unclosed on the saddle, straddling the latter, and with the fold riding on the peak of the saddle. The pusher blade 90 now starts the sheets forward and the pusher fingers 77 push the sheets forward, bringing the paper in under the tapes 105 and 106 and into position under the stitcher 116. At this moment the pusher fingers 77 disappear, leaving the sheets under the stitcher 116, where they are stitched. The pusher fingers 83 now come into play and move the sheets forward along the saddle until they are brought over the tucker blade 121, which latter then rises and closes the sheets by bringing them into the bite of the rollers 117 and 118, after which the sheets are carried to the S-delivery 133 and thence out of the machine by the belt 134. Instead of bringing sheets to the cylinder 9 by means of the cylinder 10, they may be delivered thereto in any suitable manner, as by means of the sheet path 16. And this brings out the point that while the invention is more particularly adapted for use in connection with a web press, it need not necessarily be so used. If desired, sheets may be delivered to the cylinder 9 both from the cylinder 10 and from the sheet path 16.

In Fig. 10 is shown a modification. In this instance the grippers 24 on the cylinder 10 take the sheets and retain hold thereof until the creasers 19 have folded the sheets into the nippers 18 of the cylinder 9. Then the grippers release the sheets and they are not only folded but also closed up and are so delivered to the horizontal sheet support 139 which takes the place of the saddle 13. The sheets are here progressed by a conveyer having pusher fingers 77 as before and are carried thereby to a stitcher, and a delivery mechanism.

138 denotes a guard for the sheets which may also act as a stripper. This guard may be used in connection with the other forms of invention herein shown.

In Fig. 11 is shown still another modification in which the cylinder 9 delivers the sheets unfolded to the horizontal sheet support 139, after which the sheets are stitched, folded and delivered.

In all the forms except Fig. 11 the crease in the paper determines the position of the stitch.

What is claimed, is:

1. The combination with the form and impression members of a web press, of web associating means, a sheet path extending substantially parallel to the direction of movement of the web, cylinders for cutting the web into sheets and conveying them to the sheet path arranged with their axes parallel to the sheet path, and a stitcher adapted to act on the sheets conveyed by the sheet path.

2. The combination with the form and impression members of a web press, of web associating means, a sheet path extending substantially parallel to the direction of movement of the web, cylinders for cutting and folding the web into sheets interposed between the web associating means and the sheet path and arranged with their axes parallel to the sheet path, and a stitcher adapted to act upon the sheets conveyed by the sheet path.

3. The combination with the form and impression members of a web press, of web associating means, a sheet path extending substantially parallel to the direction of movement of the web, means for cutting the web into sheets, means for folding the sheets without closing them up, interposed between the web associating means and the sheet path, a stitcher adapted to act upon the sheets fed by the sheet path, and means for closing up the sheets after stitching.

4. The combination with the form and impression members of a web printing machine in which the columns are arranged lengthwise of the cylinders and transversely of the movement of the web, of web associating means, a sheet path extending substantially parallel to the movement of the web, cylinders interposed between the web associating means and the sheet path and arranged with their axes parallel to the sheet path for severing the webs transversely into sheets and for delivering the sheets to the sheet path with their printed columns parallel to the direction of movement of the web, and a stitcher adapted to act upon the sheets conveyed by the sheet path.

5. The combination with the form and impression members of a web printing machine in which the columns are arranged lengthwise of the cylinders and transversely of the movement of the web, of web associating means, means for severing the web transversely into sheets, means for folding the sheets, a sheet path extending substantially parallel with the movement of the web, means for delivering the folded sheets to the sheet path with their printed columns parallel to the direction of the movement of the web, and means for stitching the sheets adapted to act upon the sheets fed by the sheet path.

6. The combination with the form and impression members of a web printing machine in which the columns are arranged lengthwise of the cylinders and transversely of the movement of the web, of web associating means, means for severing the web transversely into sheets, means for folding the sheets without closing them up, a sheet path extending substantially parallel with the movement of the web, means for delivering the folded but unclosed sheets to the sheet path with their printed columns parallel to the direction of movement of the web, means for stitching the sheets adapted to act upon the sheets conveyed by the sheet path, and means for closing up the sheets after stitching.

7. The combination with the form and impression members of a web printing machine, of web associating means, a rectilinear sheet path located below the web associating means, a plurality of cylinders located below the web associating means and above the sheet path with their axes parallel to the sheet path for cutting the web into sheets and for conveying the sheets to the sheet path, and a stitcher adapted to act on the sheets conveyed by the sheet path.

8. The combination with the form and impression members of a web printing machine, of web associating means, a rectilinear sheet path located below the web associating means, a plurality of cylinders located below the web associating means and above the sheet path with their axes parallel to the sheet path for cutting and folding the webs into sheets and for conveying the sheets to the sheet path, and a stitcher adapted to act on the sheets conveyed by the sheet path.

9. The combination with the form and impression members of a web printing machine, of web associating means, a plurality of cylinders, located below the web associating means, for cutting the web into sheets and for conveying and folding the sheets without closing them up, a rectilinear sheet path located below the cylinders adapted to receive the folded sheets therefrom, a stitcher adapted to act on the sheets conveyed by the sheet path, and means for closing up the sheets after stitching.

Signed at New York, in the county of New York and State of New York this 20th day of September A. D. 1911.

DAVID J. SCOTT.

Witnesses:
 Louisa E. Simson,
 Philip S. McLean.